(12) United States Patent (10) Patent No.: US 8,666,910 B2
Chen et al. (45) Date of Patent: Mar. 4, 2014

(54) SEARCH DEVICE AND ASSOCIATED METHODS

(75) Inventors: Homer-H Chen, Taipei (TW); Yi-Hsuan Yang, Taipei (TW)

(73) Assignee: National Taiwan University, Taipei (TW)

( * ) Notice: Subject to any disclaimer, the term of this patent is extended or adjusted under 35 U.S.C. 154(b) by 956 days.

(21) Appl. No.: 12/423,988

(22) Filed: Apr. 15, 2009

(65) Prior Publication Data

US 2010/0145892 A1 Jun. 10, 2010

(30) Foreign Application Priority Data

Dec. 10, 2008 (TW) ............................. 97148087 A

(51) Int. Cl.
*G06F 17/30* (2006.01)
(52) U.S. Cl.
USPC ........................................................ 706/12
(58) Field of Classification Search
None
See application file for complete search history.

(56) References Cited

U.S. PATENT DOCUMENTS

| | | | |
|---|---|---|---|
| 6,190,314 B1* | 2/2001 | Ark et al. ...................... 600/300 |
| 8,069,125 B2* | 11/2011 | Jung et al. ........................ 706/11 |
| 2004/0189702 A1* | 9/2004 | Hlavac et al. .................. 345/757 |
| 2004/0210661 A1* | 10/2004 | Thompson ..................... 709/228 |
| 2006/0122842 A1* | 6/2006 | Herberger et al. ............ 704/278 |
| 2007/0291958 A1* | 12/2007 | Jehan ............................. 381/103 |
| 2009/0106171 A1* | 4/2009 | Hlavac et al. .................. 706/11 |
| 2009/0164503 A1* | 6/2009 | Jung et al. ........................ 707/102 |
| 2009/0281906 A1* | 11/2009 | Cai et al. ......................... 705/26 |
| 2009/0318773 A1* | 12/2009 | Jung et al. ...................... 600/300 |
| 2010/0191037 A1* | 7/2010 | Cohen et al. .................... 600/28 |
| 2011/0022615 A1* | 1/2011 | Yang et al. ..................... 707/758 |

OTHER PUBLICATIONS

Yang et al."Mr. Emo: Music Retrieval in the Emotion Plane", ACM, Oct. 26-31, 2008, pp. 1003-1004.*
Wu et al. "Interactive Content Presentation Based on Expressed Emotion and Physiological Feedback", ACM, Oct. 26-31, 2008, pp. 1009-1010.*
Yang et al. "Music Emotion Classification: A Regression Approach", IEEE, 2007, pp. 208-211.*
Korhonen et al. "Modelling Emotional Content of Music Using System Identification", IEEE, 2006.*
Yang et al. "Music Emotion Classification: A Fuzzy Approach", ACM, 2006, pp. 81-84.*
Tzanetakis et al. "Marsyas: A framework for Audio Analysis", Princeton University, 2000, pp. 1-13.*
Meyers, "A Mood-Based Music Classification and Exploration System", Massachussets Institute of Technology, 2007, pp. 1-93.*
Cabrera, "Psysound: A Computer Program for Psychoacoustical Analysis", 1999, pp. 47-54.*

(Continued)

*Primary Examiner* — Kakali Chaki
*Assistant Examiner* — Walter Hanchak
(74) *Attorney, Agent, or Firm* — Morris Manning & Martin LLP; Tim Tingkang Xia

(57) ABSTRACT

A search device and associated methods use music emotions to browse, organize and retrieve music collections. The search device comprises a processor and an interface. The processor uses machine learning techniques to determine music emotion according to music features and organizes music by emotions for browsing and retrieving music collections. The interface connects to the processor and allows a person to retrieve desired music from the processor. Methods associated with the search device comprise a processor initialization method, a method of loading new music into the search device and several methods of retrieving desired music from the search device.

1 Claim, 2 Drawing Sheets

(56) References Cited

OTHER PUBLICATIONS

Hu et al. "Exploring Mood Metadata: Relationships with Genre, Artist and Usage Metadata", ISMIR 2007, 6 pages.*

Meyers, "A Mood-Based Music Classification and Exploration System", 2007, Massachusetts Institute of Technology, 93 pages.*

Shubert, "Measurement and Time Series Analysis of Emotion in Music", Univeristy of New South Wales, 1999, 419 pages.*

Kuo, Chiang, Shan, Lee, "Emotion-baed Music Recomendation by Association Discovery from Film Music", Proc. of 13 th Annual ACM International Conference on Multimedia, 2005, pp. 507-510.*

Hu et al., "Exploring Mood Metadata: Relationships with Genre, Artist and Usage Metadata", ISMIR 2007, pp. 1-6.*

Trohidis, Tsoumakas, Kalliris, Vlahavas, "Multi-label Classification of Music into Emotions", ISMIR 2008, Sep. 2008, pp. 325-330.*

Juslin, Karlsson, Lindstrom, Friberg, Schoonderwaldt, "Play It Again with Feeling: Computer Feedback in Musical Communication of Emotions", Journal of Experimental Psychology: Applied, vol. 12, No. 2, 2006, pp. 79-85.*

Korhonen et al., "Modelling Emotional Content of Music Using System Identification", IEEE, 2006.*

Yang, Lin, Cheng, Chen, "Mr. Emo: Music Retrieval in the Emotion Plane", Proceeding MM '08 Proceedings of the 16th ACM international conference on Multimedia, 2008, pp. 1003-1004.*

* cited by examiner

SEARCH DEVICE AND ASSOCIATED METHODS

FIELD OF THE INVENTION

The present invention relates to a search device and associated methods, especially to a search device and associated methods using music emotions for retrieving, browsing and organizing music collections.

DESCRIPTION OF THE RELATED ART

As technology improves the storage of a database, a single database can store thousands of pieces of music. Therefore, efficient organization and musical search methods are needed.

Research about organizing, browsing and searching music has been reported in the field of music emotion classification (MEC). MEC provides a more convenient and efficient way of organizing and searching music by using music emotions, rather than a conventional text-based search method.

A typical approach is to categorize music collections into a number of classes or taxonomies (such as happy, sad, angry or relaxing). Thus, a person can search, organize and browse the music collections without remembering a music title, an artist name or any keyword relating to a desired music.

However, classifying work obviously faces a challenge of determining correct emotions of the music and the description of each emotion varies from person to person.

SUMMARY OF THE INVENTION

The objective of a search device and associated methods in accordance with the present invention is to automatically sense a desired music emotion and automatically retrieve a corresponding piece of music for the particular desired music emotion sensed.

The search device and associated methods in accordance with the present invention uses music emotions to browse, organize and retrieve music collections.

The search device comprises a processor and an interface. The processor uses machine learning techniques to determine music emotion according to music features and organizes music by emotions for browsing and retrieving music collections. The interface connects to the processor and allows a person to retrieve desired music from the processor.

Methods associated with the search device comprise a processor initialization method, a method of loading new music into the search device and several methods of retrieving desired music from the search device.

DETAILED DESCRIPTION OF THE PRESENT INVENTION

Figure 1:
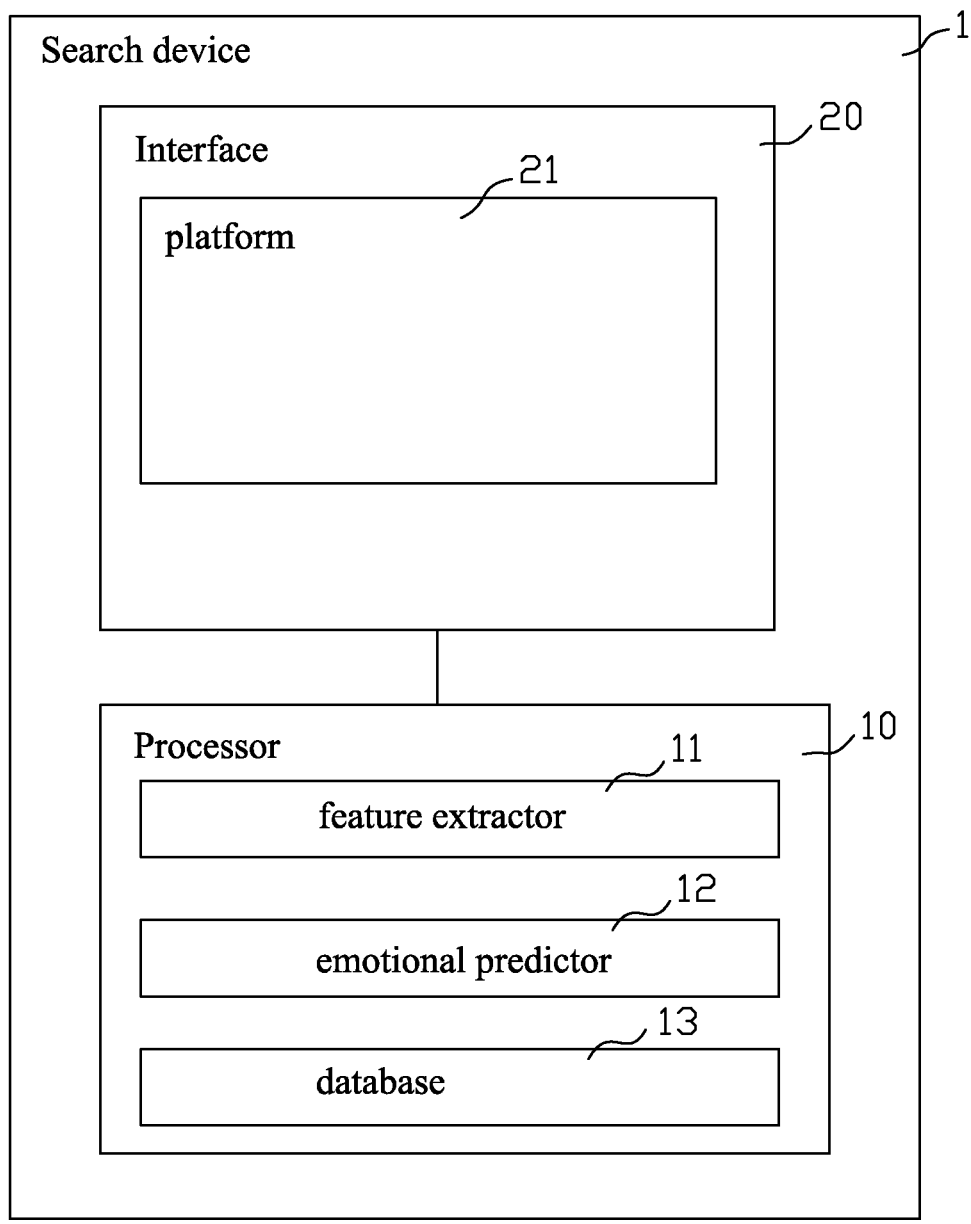
FIG. 1 is a block diagram of a search device in accordance with the present invention.

With reference to FIG. 1, a search device (1) and associated search methods in accordance with the present invention use music emotions to browse, organize and retrieve music collections.

The search device (1) may be a mobile phone, a computer or an MPEG-1 Audio Layer-3 (MP3) player and comprises a processor (10) and an interface (20).

The processor (10) organizes music by emotions for browsing and retrieving music collections and comprises a database (13), a feature extractor (11) and an emotional predictor (12).

The database (13) stores multiple music collections, music information and corresponding emotional values.

The feature extractor (11) extracts features of music from audio spectrums, frequencies, harmonic signal distributions, power distribution, loudness, level, pitch, dissonance, timbral texture, rhythmic content and pitch content.

The emotional predictor (12) predicts music's emotion using machine learning techniques based on extracted features and gives each musical selection two emotional values.

The emotional values comprise an arousal value ($R_a$) and a valence value ($R_v$).

The music information comprises music title, artist, lyrics, music type, language and record company.

The interface (20) connects to the processor (10) and allows a person to specify one or more pairs of coordinates in an emotion space and retrieve the desired music from the database (13) based on the specified music emotion and comprises a platform (21).

The platform (21) is a 2-dimensional sensing device, such as a flat panel touch display, with a two-dimensional coordinate system for detecting the two-dimensional coordinates of the contact when a user touches the platform (21).

The coordinate system comprises multiple parallel longitudinal arousal sensors and multiple parallel valence sensors. The valence sensors intersect the longitudinal sensors and define multiple emotional coordinates $E_i$ ($R_a$, $R_v$).

The desired music emotion may comprise the emotional coordinate that conforms to the emotional values, the optional music information or both.

Figure 2:
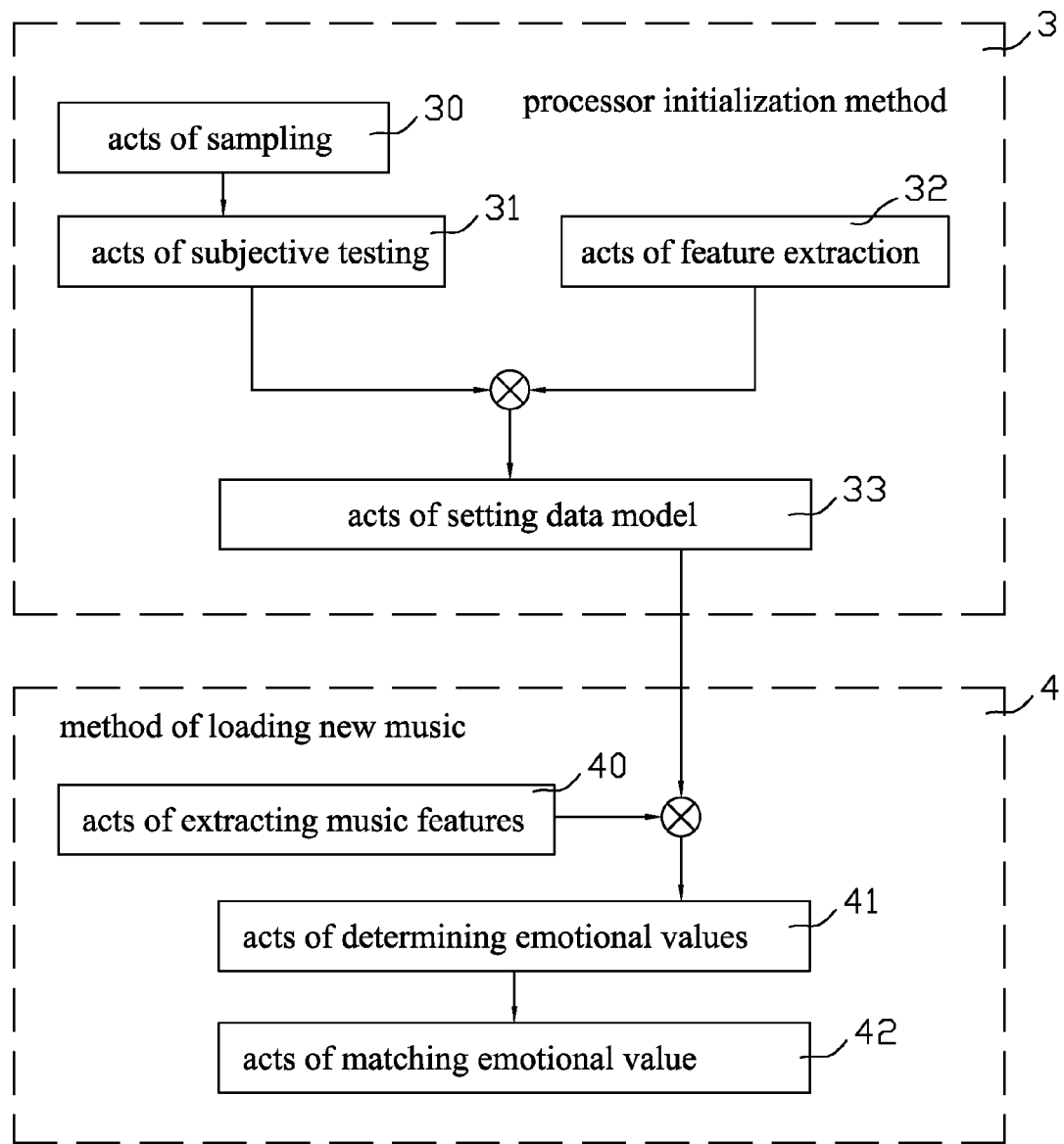
FIG. 2 is a flow chart of a method of building the search device in FIG. 1.

With further reference to FIG. 2, methods associated with the search device (1) comprise a processor initialization method (3), a method of loading new music (4) into the search device (1) and several methods of retrieving desired music from the search device (1).

The processor initialization method (3) uses machine learning techniques to build a data model for music emotion predictions and comprises acts of sampling (30), subjective testing (31), feature extraction (32) and setting data model (33).

The act of sampling (30) comprises choosing multiple clips of music from different fields and languages, converting the music clips to a uniform audio format (such as 22 KHz, 16 bits, mono channel waveform audio format (WAV) music) and possibly trimming the music clips to 25 seconds for efficient sampling.

The act of subjective testing (31) surveys a group of people, records their emotional assessment of the music clip into two basic values and averages the basic values as a basis for the music emotion for each music clip.

Each basic value of the arousal point ($R_a$) and the valence point ($R_v$) of the emotional coordinates ranges from −1.0 to 1.0 ([−1.0, 1.0]).

The act of feature extraction (32) extracts features of each music clip from the feature extractor and may apply a conventional spectral contrast algorithm, a conventional Daubechies wavelets coefficient histogram (DWCH) algorithm, a conventional PsySound program and a conventional Marsyas program.

The spectral contrast algorithm extracts features through audio spectrums, frequencies and harmonic signal distributions of the clipped music.

The Daubechies wavelets coefficient histogram (DWCH) algorithm extracts features by calculating the average, variance or skewness power distribution of the music clip.

The PsySound program extracts features of loudness, level, pitch and dissonance from the music clip.

The Marsyas program extracts features of timbral texture, rhythmic content and pitch content from the music clip.

The act of setting a data model (33) sets a data model for the emotional predictor and executes at least one conventional regression algorithm to formulate the prediction of music emotion into a regression function. The conventional regression algorithms may be selected from a multiple linear regression (MLR), a support vector regression (SVR) and an AdaBoost RT algorithm.

The method of loading new music (4) predicts emotional values of new music collections by the emotional predictor, senses the emotional coordinates of the desired music emotion, retrieves corresponding music and comprises acts of extracting music features (40), determining emotional values (41) and matching emotional value (42).

The act of extracting music features (40) extracts features of new music by using feature extraction (32).

The act of determining emotional values (41) predicts emotional values of music based on the data model and stores the emotional values in the database (13).

The act of matching emotional values (42) with the desired emotional value to obtain the desired music emotion through the interface (20) selects the nearest emotional values to the desired music emotion stored in the database (13) and returns corresponding music to the interface (20).

Therefore, music in the database (13) can be browsed and retrieved by giving the emotional coordinates $E_i$ ($R_a$, $R_v$) of the desired music emotion to the interface (20), and the processor (10) will return the music nearest to the desired emotion.

Since the search device (1) automatically predicts the emotion of the music without any manual intervention, each music is represented by a pair of emotion coordinates ($R_v$, $R_a$) in the emotion space having an arousal axis and a valence axis.

A retrieval method using the search device (1) is selected from a query-by-emotion-point (QBEP) method, a query-by-emotion-trajectory (QBET) method, a query-by-artist-emotion (QBAE) method and a query-by-emotion-region (QBER) method.

The QBEP method comprises acts of emotional coordinate indication and music collection retrieval.

The act of emotional coordinate indication comprises indicating an emotional coordinate of desired music emotion from the platform.

The QBEP method comprises acts of emotion coordinates indication and music retrieval.

The act of emotion coordinates indication comprises sensing a point of desired music emotion from the platform.

The act of music retrieval comprises receiving the emotion coordinates and retrieving music corresponding to the emotion coordinates.

The QBET method comprises acts of emotion coordinates indication and music retrieval.

The act of emotion coordinates indication comprises sensing a trajectory of desired music emotions from the platform and quantizing in the trajectory. The quantization of the trajectory is to represent the trajectory by a finite number of points.

The act of music collection retrieval comprises retrieving corresponding music collections and generating a music playlist of the music collections.

The QBAE method is a combination of the QBEP and a conventional artist-based retrieval method, retrieves corresponding music collections of a particular artist with corresponding music's emotions and comprises acts of entity determination, music collection retrieval and artist retrieval.

The act of desired music emotion determination may be selection of emotion coordinates or an artist.

If the desired music emotion is selected based on an artist, the act of music retrieval retrieves the songs of the artist in the database and display the songs on the platform according to the emotion coordinates of the songs.

If the desired music emotion is selected based on emotion coordinates, the act of artist retrieval comprises receiving the emotion coordinates, retrieving music corresponding to the emotion coordinates, and generating an artist list corresponding to the retrieved music.

The QBER method retrieves multiple pieces of music in a corresponding region and comprises indicating emotion coordinates.

The act of emotion coordinates indication comprises sensing a region of desired music emotions from the platform and quantizing the region. The quantization of the region is to represent the region by a finite number of poionts.

The act of music retrieval comprises retrieving a collection of music corresponding to emotion coordinates of the points within the specified region and generating a music playlist of the music collection.

By using the foregoing methods and the associated device, music of a particular emotion selection can be easily retrieved without knowing the music titles or artist.

What is claimed is:

1. A retrieval method for a search device, comprising:
   selecting a query method from a query-by-emotion-point (QBEP) method, a query-by-emotion-trajectory (QBET) method, a query-by-artist-emotion (QBAE) method and a query-by-emotion-region (QBER) method through an interface of the search device, wherein the QBAE method is a combination of the QBEP and a conventional artist-based retrieval method, and the QBEP method, the QBET method, the QBAE method and the QBER method are run on the search device;
   receiving at least one pair of emotion coordinates of a specific music emotion in an emotion space by a user; and
   retrieving at least one desired music based on the emotion coordinates using the query method,
   wherein the search device comprises a processor configured to organize music by emotions in the emotion space for browsing and retrieving music collections, the emotion space is a 2-dimentional coordinate system and has an arousal axis and a valence axis, and each music is represented by a pair of emotion coordinates ($R_v$, $R_a$) in the emotion space;
   wherein when the QBEP query method is selected as the query method, the search device retrieves multiple pieces of the desired music corresponding to the specific music emotion by:
   receiving a point of the desired music emotion; and
   generating the emotion coordinates according to the point; and
   retrieving the desired music corresponding to the emotion coordinates;

wherein when the QBET query method is selected as the query method, the search device retrieves multiple pieces of the desired music with specific song-by-song emotion variation by:
- receiving a trajectory of desired music emotions from the platform and quantizing the trajectory to generate a series of emotion coordinates; and
- receiving the series of emotion coordinates; and
- retrieving a list of the desired music ordered in such a way that the song-by-song emotion variation in the music list is consistent with the emotion variation specified by the trajectory;

wherein when the QBAE query method is selected as the query method, the search device retrieves music collections of at least one artist corresponding to the specific music emotion by:
- receiving the emotion coordinates;
- retrieving music corresponding to the emotion coordinates; and
- generating an artist list corresponding to the retrieved music; and wherein when the QBER query method is selected as the query method, the search device retrieves multiple pieces of music in a region by:
- receiving a region of desired music emotions and quantizing the region; and
- retrieving a collection of music with emotion coordinates within the region and generating a music playlist of the music collection.

* * * * *